(12) United States Patent
Bhaskaran

(10) Patent No.: US 11,470,479 B2
(45) Date of Patent: Oct. 11, 2022

(54) DYNAMIC SPECTRUM SHARING IN WIRELESS COMMUNICATIONS SYSTEMS

(71) Applicant: AltioStar Networks, Inc., Tewksbury, MA (US)

(72) Inventor: Sridhar Bhaskaran, Bangalore (IN)

(73) Assignee: Altiostar Networks, Inc., Tewksbury, MA (US)

( * ) Notice: Subject to any disclaimer, the term of this patent is extended or adjusted under 35 U.S.C. 154(b) by 354 days.

(21) Appl. No.: 16/787,735

(22) Filed: Feb. 11, 2020

(65) Prior Publication Data

US 2021/0250773 A1    Aug. 12, 2021

(51) Int. Cl.
*H04W 16/14*    (2009.01)
*H04W 76/15*    (2018.01)
*H04W 24/02*    (2009.01)
*H04W 72/04*    (2009.01)

(52) U.S. Cl.
CPC ........... *H04W 16/14* (2013.01); *H04W 24/02* (2013.01); *H04W 72/0453* (2013.01); *H04W 76/15* (2018.02)

(58) Field of Classification Search
CPC ..... H04W 16/14; H04W 76/15; H04W 24/02; H04W 72/0453
See application file for complete search history.

(56) References Cited

U.S. PATENT DOCUMENTS

| 2015/0078173 | A1* | 3/2015 | Javed | H04W 24/08 370/241 |
| 2020/0235788 | A1* | 7/2020 | Rajagopal | H04B 7/0848 |

FOREIGN PATENT DOCUMENTS

EP    2897433 A1    7/2015

OTHER PUBLICATIONS

International Search Report and Written Opinion, dated May 27, 2021, International Application No. PCT/US2021/017442, filed Feb. 10, 2021.
SK TELECOM et al., "Considerations on function split for 5G deployment", 3GPP Draft; R3-171934, 3rd Generation Partnership Project (3GPP), Mobile Competence Centre; 650, Route Des Lucioles; F-06921 Sophia-Antipolis Cedex; FRANCE, vol. RAN WG3, No. Hangzhou; May 15, 2017-May 19, 2017 May 18, 2017 (May 18, 2017), XP051276696.
KT Corp: "Consideration for NR RAN internal interface for higher layer functional split", 3GPP Draft; R3-16XXXX NR RAN FHI_R4 (KT), 3rd Generation Partnership Project (3GPP), Mobile Competence Centre; 650, Route Des Lucioles; F-06921 Sophia-Antipolis Cedex; FRANCE, vol. RAN WG3, No. Sophia Antipolis, France; Oct. 10, 2016-Oct. 14, 2016 Oct. 6, 2016 (Oct. 6, 2016), XP051152132.

(Continued)

*Primary Examiner* — Joshua L Schwartz
(74) *Attorney, Agent, or Firm* — Mintz Levin Cohn Ferris Glovsky and Popeo, P.C.

(57) ABSTRACT

A method, an apparatus, a system, and a computer program product for performing dynamic spectrum sharing in a wireless communication system. A control plane message identifying a radio resource in a plurality of radio resources for controlling transmission of a data packet in a plurality of data packets between a plurality of communication devices is generated. The generated control plane message is transmitted. Using the identified radio resource, transmission of the data packet is controlled in a user plane.

30 Claims, 13 Drawing Sheets

(56) References Cited

OTHER PUBLICATIONS

ZTE: "Impacts on Radio Aggregation Scenarios due to CU-DU Separation", 3GPP Draft; R3-161593 Impacts on Radio Aggregation Scenarios Due to Cu-Du Separation V4, 3rd Generation Partnership Project (3GPP), Mobile Competence Centre; 650, Route Des Lucioles; F-06921 Sophia, vol. RAN WG3, No. Gothenburg, Sweden; Aug. 22, 2016-Aug. 26, 2016 Aug. 21, 2016 (Aug. 21, 2016), XP051127444.

* cited by examiner

FIG. 6.

| | 0 (msb) | 1 | 2 | 3 | 4 | 5 | 6 | 7 (lsb) | # of bytes | |
|---|---|---|---|---|---|---|---|---|---|---|
| | \multicolumn{8}{c}{Section Type 1, DL/UL control msg.} | | |
| | \multicolumn{8}{c}{transport header, see section 3.1.3} | 8 | Octet 1 |
| | dataDirection | payloadVersion | | | | filterIndex | | | 1 | Octet 9 |
| | \multicolumn{8}{c}{frameId} | 1 | Octet 10 |
| | subframeId | | | | slotId | | | | 1 | Octet 11 |
| | slotId | | \multicolumn{6}{c}{startSymbolId} | 1 | Octet 12 |
| | \multicolumn{8}{c}{numberOfSections} | 1 | Octet 13 |
| | \multicolumn{8}{c}{sectionType = 1} | 1 | Octet 14 |
| | \multicolumn{8}{c}{udCompHdr} | 1 | Octet 15 |
| | \multicolumn{8}{c}{reserved} | 1 | Octet 16 |
| | \multicolumn{8}{c}{sectionId} | 1 | Octet 17 |
| | sectionId | | | | rb | symInc | startPrbc | | 1 | Octet 18 |
| | \multicolumn{8}{c}{startPrbc} | 1 | Octet 19 |
| | \multicolumn{8}{c}{numPrbc} | 1 | Octet 20 |
| | \multicolumn{8}{c}{reMask[11:4]} | 1 | Octet 21 |
| | reMask[3:0] | | | | \multicolumn{4}{c}{numSymbol} | 1 | Octet 22 |
| | \multicolumn{8}{c}{beamId[14:8]} | 1 | Octet 23 |
| ef = 1 | \multicolumn{8}{c}{beamId[7:0]} | 1 | Octet 24 |
| | \multicolumn{8}{c}{section extensions as indicated by "ef"} | var | Octet 25 |
| | \multicolumn{8}{c}{sectionId} | 1 | Octet N |
| | sectionId | | | | rb | symInc | startPrbc | | 1 | N+1 |
| | \multicolumn{8}{c}{startPrbc} | 1 | N+2 |
| | \multicolumn{8}{c}{numPrbc} | 1 | N+3 |
| | \multicolumn{8}{c}{reMask[11:4]} | 1 | N+4 |
| | reMask[3:0] | | | | \multicolumn{4}{c}{numSymbol} | 1 | N+5 |
| | \multicolumn{8}{c}{beamId[14:8]} | 1 | N+6 |
| ef = 0 | \multicolumn{8}{c}{beamId[7:0]} | 1 | N+7 |
| | \multicolumn{8}{c}{section extensions as indicated by "ef"} | var | N+8 |
| | | | | | | | | | | Octet M |

600

602
602

DYNAMIC SPECTRUM SHARING IN WIRELESS COMMUNICATIONS SYSTEMS

TECHNICAL FIELD

In some implementations, the current subject matter relates to telecommunications systems, and in particular, to dynamic spectrum sharing in wireless communications systems, such as, for example, long term evolution ("LTE") and 5G New Radio ("NR") which may include a lower layer split architecture.

BACKGROUND

In today's world, cellular networks provide on-demand communications capabilities to individuals and business entities. Typically, a cellular network is a wireless network that can be distributed over land areas, which are called cells. Each such cell is served by at least one fixed-location transceiver, which is referred to as a cell site or a base station. Each cell can use a different set of frequencies than its neighbor cells in order to avoid interference and provide improved service within each cell. When cells are joined together, they provide radio coverage over a wide geographic area, which enables a large number of mobile telephones, and/or other wireless devices or portable transceivers to communicate with each other and with fixed transceivers and telephones anywhere in the network. Such communications are performed through base stations and are accomplished even if when mobile transceivers are moving through more than one cell during transmission. Major wireless communications providers have deployed such cell sites throughout the world, thereby allowing communications mobile phones and mobile computing devices to be connected to the public switched telephone network and public Internet.

A mobile telephone is a portable telephone that is capable of receiving and/or making telephone and/or data calls through a cell site or a transmitting tower by using radio waves to transfer signals to and from the mobile telephone. In view of a large number of mobile telephone users, current mobile telephone networks provide a limited and shared resource. In that regard, cell sites and handsets can change frequency and use low power transmitters to allow simultaneous usage of the networks by many callers with less interference. Coverage by a cell site can depend on a particular geographical location and/or a number of users that can potentially use the network. For example, in a city, a cell site can have a range of up to approximately ½ mile; in rural areas, the range can be as much as 5 miles; and in some areas, a user can receive signals from a cell site 25 miles away.

The following are examples of some of the digital cellular technologies that are in use by the communications providers: Global System for Mobile Communications ("GSM"), General Packet Radio Service ("GPRS"), cdmaOne, CDMA2000, Evolution-Data Optimized ("EV-DO"), Enhanced Data Rates for GSM Evolution ("EDGE"), Universal Mobile Telecommunications System ("UMTS"), Digital Enhanced Cordless Telecommunications ("DECT"), Digital AMPS ("IS-136/TDMA"), and Integrated Digital Enhanced Network ("iDEN"). The Long Term Evolution, or 4G LTE, which was developed by the Third Generation Partnership Project ("3GPP") standards body, is a standard for a wireless communication of high-speed data for mobile phones and data terminals. A 5G LTE standard is currently being developed. LTE is based on the GSM/EDGE and UMTS/HSPA digital cellular technologies and allows for increasing capacity and speed by using a different radio interface together with core network improvements.

Mobile devices are used for receiving and transmitting of various types of data, such as, voice data (e.g., telephone calls), emails, text messages, Internet browsing, video data (e.g., videos, video calling, augmented/virtual reality, etc.), audio data (e.g., streaming of songs), etc. Different types of data can require different transmission bandwidth. For example, in order to reproduce a high-definition video on a mobile device having a good quality, a higher bandwidth may be required as compared to transmission of an email or a text message to the mobile device. 5G NR networks implement network slicing feature to accommodate different types of data traffic, usage, etc. However, end-to-end network slicing and selection has not been clearly defined.

SUMMARY

In some implementations, the current subject matter relates to a computer implemented method for performing dynamic spectrum sharing in a wireless communication network. The method can include generating a control plane message identifying a radio resource in a plurality of radio resources for controlling transmission of a data packet in a plurality of data packets between a plurality of communication devices, transmitting the generated control plane message, and controlling, using the identified radio resource, transmission of the data packet in a user plane.

In some implementations, the current subject matter can include one or more of the following optional features. The transmission of the generated control plane message can include transmitting the generated control plane message from a first communication device to a second communication device in a plurality of communication devices. Further, at least one of the generating, the transmitting and the controlling can be performed by a base station. The base station can include at least one of the following communication components: one or more remote radio units, and one or more distributed units.

In some implementations, the identified radio resource can include at least one of the following: one or more physical resource blocks, one or more resource elements, one or more carrier components, and any combination thereof. Further, the identified radio resource can be configured to be identified using a resource element mask. In some implementations, the generated control plane message can be transmitted from one or more distributed units of one or more base stations to one or more remote units of the base stations. The distributed units can include at least one of the following: distributed units operating in a first type of communication network and distributed units operating in a second type of communication network. The remote units associated with one or more base stations and having the identified radio resource can be configured to be controlled by one or more distributed units operating in the first and second types of communication networks. By way of an example, the first type of communication network can include a new radio communication network and the second type of communication network can include a long term evolution communication network.

In some implementations, the distributed units operating in the first type of communication network can be configured to be communicatively coupled, via an interface, to the distributed units operating in the second type of communication network for coordinating sharing of the plurality of radio resources to control operation of the remote units.

Further, the distributed units operating in the first type of communication network and the distributed units operating in the second type of communication network can be configured to determine an allocation of radio resources in the plurality of radio resources for controlling operation of the one or more remote units. The allocation can be determined using a bitmap of radio resources allocated by at least one of: the distributed units operating in the first type of communication network, the distributed units operating in the second type of communication network, and any combination thereof.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 1b illustrates further detail of the exemplary LTE system shown in FIG. 1a;

FIG. 1c illustrates additional detail of the evolved packet core of the exemplary LTE system shown in FIG. 1a;

FIG. 1d illustrates an exemplary evolved Node B of the exemplary LTE system shown in FIG. 1a;

FIG. 6 illustrates an exemplary control plane message that includes a resource element mask field;

DETAILED DESCRIPTION

The current subject matter can provide for systems and methods that can be implemented in lower layer split architecture for wireless communications systems. Such systems can include various wireless communications systems, including 5G New Radio communications systems, long term evolution communication systems, etc.

One or more aspects of the current subject matter can be incorporated into transmitter and/or receiver components of base stations (e.g., gNodeBs, eNodeBs, etc.) in such communications systems. The following is a general discussion of long-term evolution communications systems and 5G New Radio communication systems.

I. Long Term Evolution Communications System

FIGS. 1a-c and 2 illustrate an exemplary conventional long-term evolution ("LTE") communication system 100 along with its various components. An LTE system or a 4G LTE, as it is commercially known, is governed by a standard for wireless communication of high-speed data for mobile telephones and data terminals. The standard is based on the GSM/EDGE ("Global System for Mobile Communications"/"Enhanced Data rates for GSM Evolution") as well as UMTS/HSPA ("Universal Mobile Telecommunications System"/"High Speed Packet Access") network technologies. The standard was developed by the 3GPP ("3rd Generation Partnership Project").

Figure 1A:
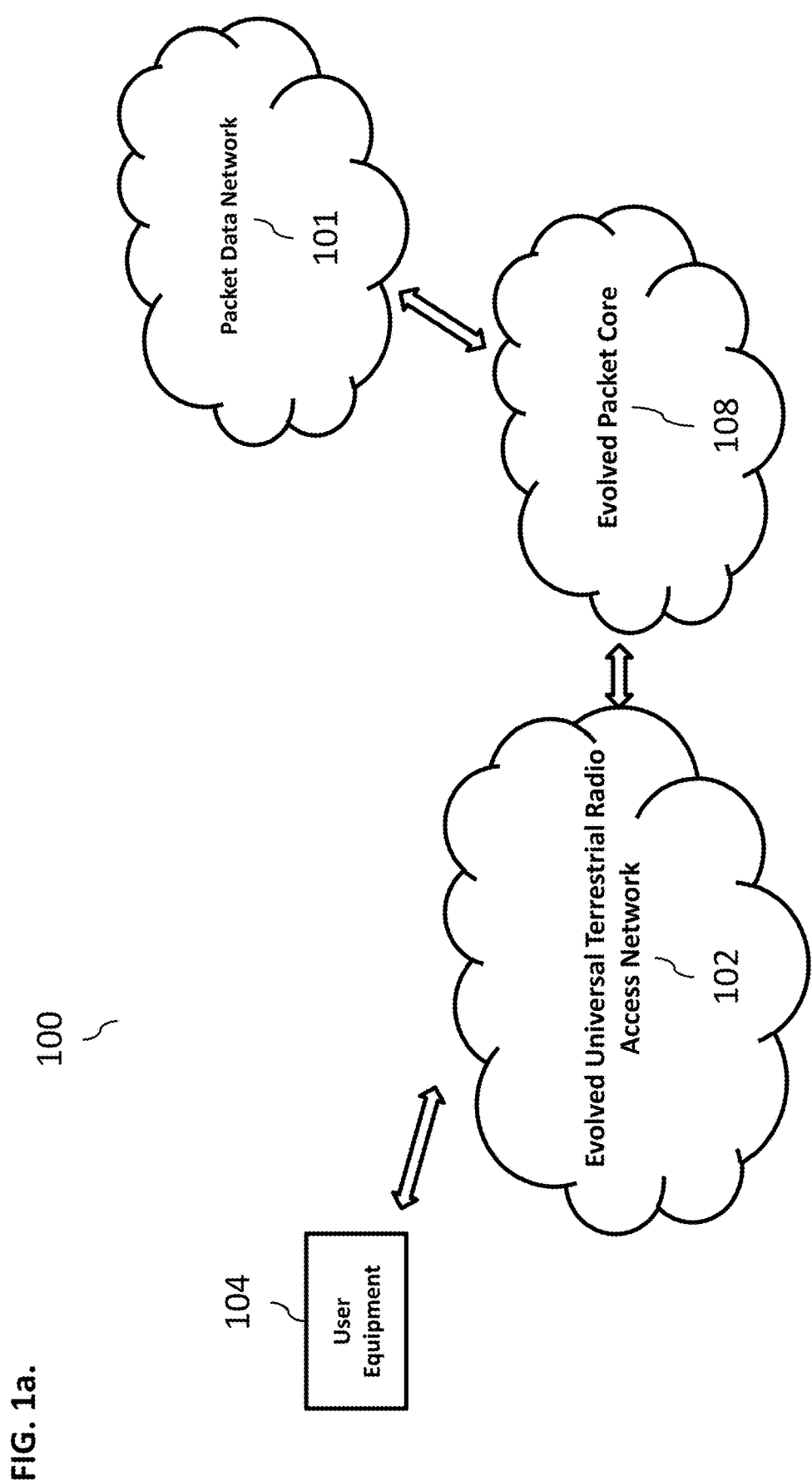
FIG. 1a illustrates an exemplary conventional long term evolution ("LTE") communications system.
Figure 1B:
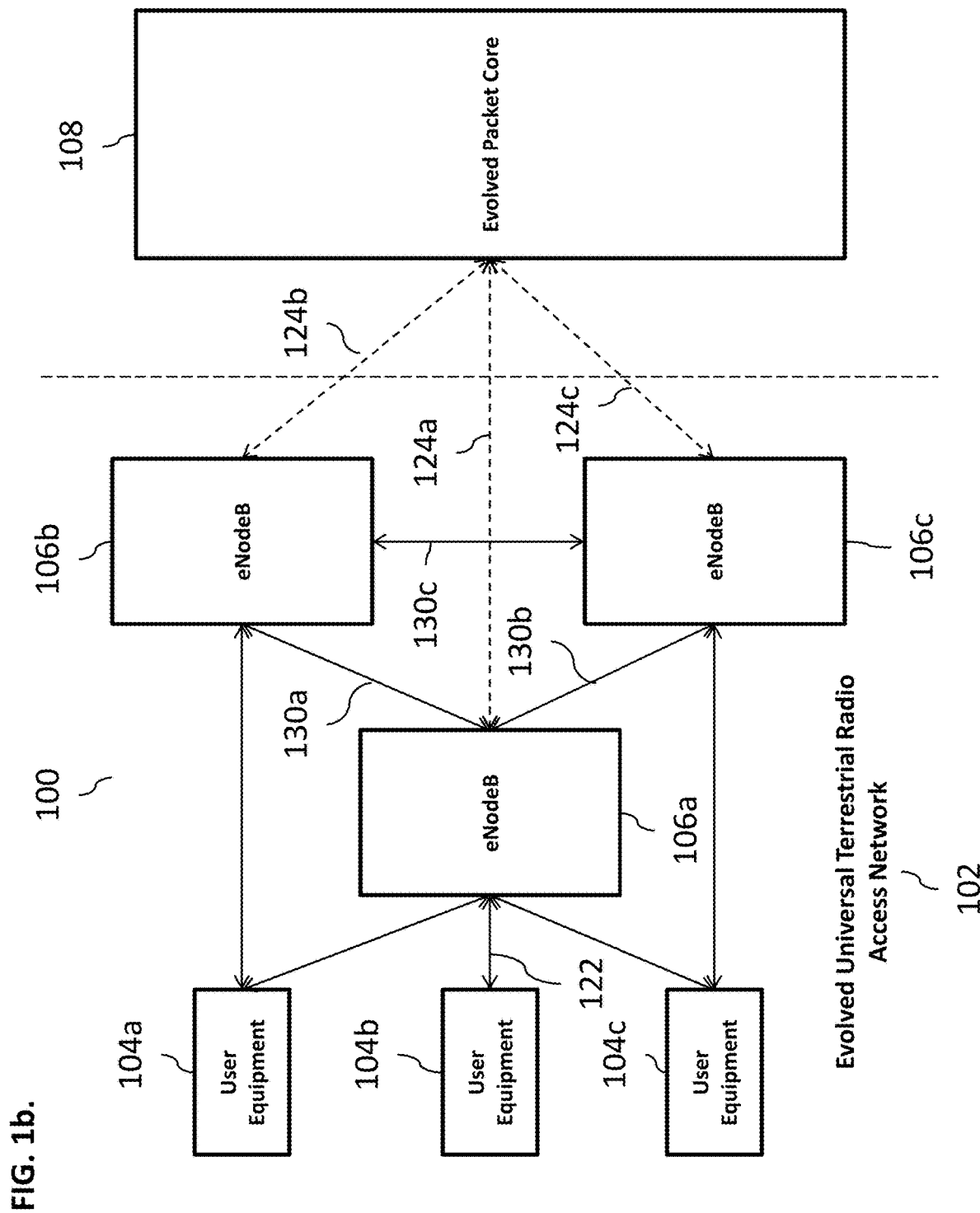

As shown in FIG. 1a, the system 100 can include an evolved universal terrestrial radio access network ("EU-TRAN") 102, an evolved packet core ("EPC") 108, and a packet data network ("PDN") 101, where the EUTRAN 102 and EPC 108 provide communication between a user equipment 104 and the PDN 101. The EUTRAN 102 can include a plurality of evolved node B's ("eNodeB" or "ENODEB" or "enodeb" or "eNB") or base stations 106 (a, b, c) (as shown in FIG. 1b) that provide communication capabilities to a plurality of user equipment 104(a, b, c). The user equipment 104 can be a mobile telephone, a smartphone, a tablet, a personal computer, a personal digital assistant ("PDA"), a server, a data terminal, and/or any other type of user equipment, and/or any combination thereof. The user equipment 104 can connect to the EPC 108 and eventually, the PDN 101, via any eNodeB 106. Typically, the user equipment 104 can connect to the nearest, in terms of distance, eNodeB 106. In the LTE system 100, the EUTRAN 102 and EPC 108 work together to provide connectivity, mobility and services for the user equipment 104.

Figure 1C:
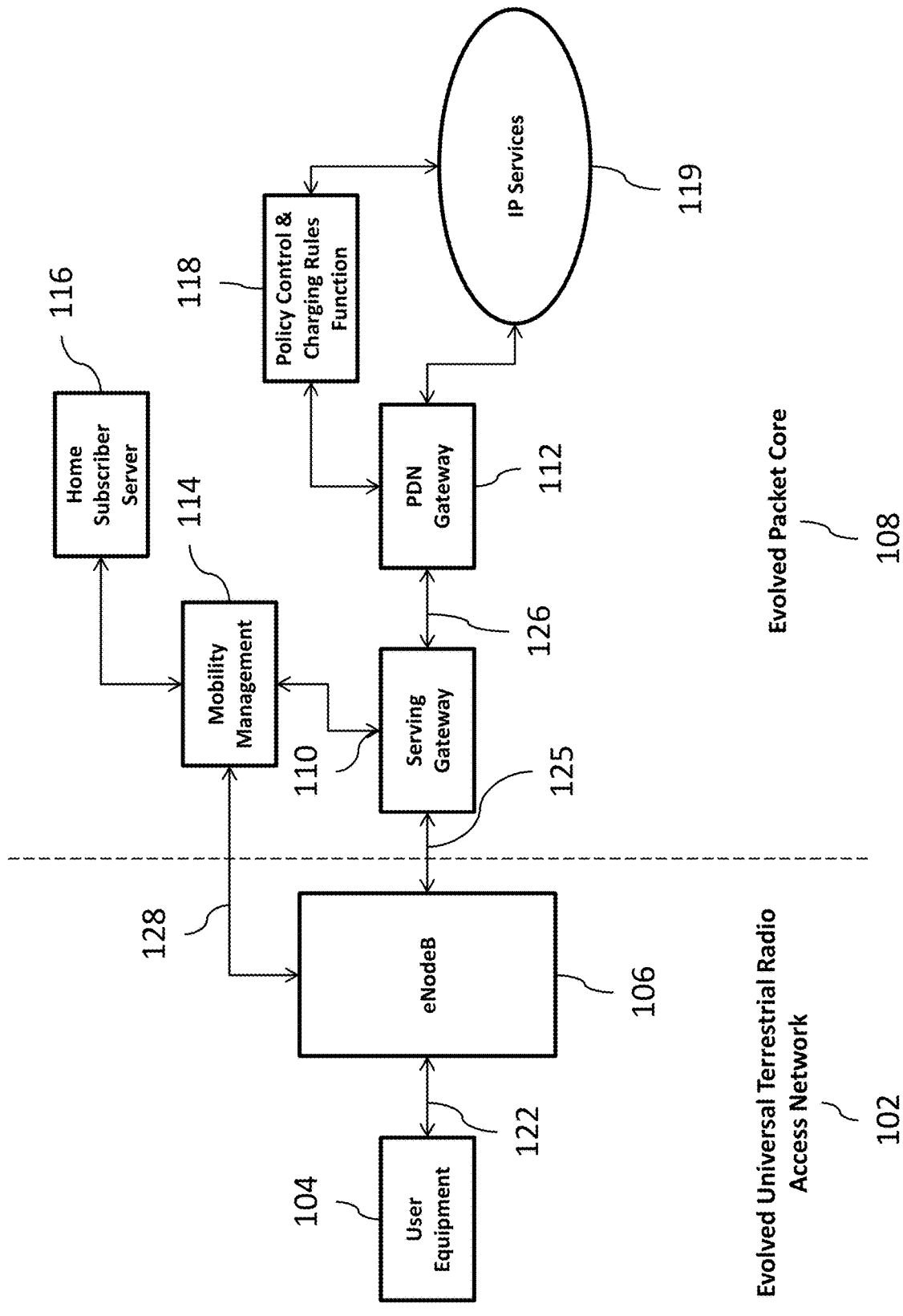

FIG. 1b illustrates further detail of the network 100 shown in FIG. 1a. As stated above, the EUTRAN 102 includes a plurality of eNodeBs 106, also known as cell sites. The eNodeBs 106 provides radio functions and performs key control functions including scheduling of air link resources or radio resource management, active mode mobility or handover, and admission control for services. The eNodeBs 106 are responsible for selecting which mobility management entities (MMES, as shown in FIG. 1c) will serve the user equipment 104 and for protocol features like header compression and encryption. The eNodeBs 106 that make up an EUTRAN 102 collaborate with one another for radio resource management and handover.

Communication between the user equipment 104 and the eNodeB 106 occurs via an air interface 122 (also known as "LTE-Uu" interface). As shown in FIG. 1b, the air interface 122 provides communication between user equipment 104b and the eNodeB 106a. The air interface 122 uses Orthogonal Frequency Division Multiple Access ("OFDMA") and Single Carrier Frequency Division Multiple Access ("SC-FDMA"), an OFDMA variant, on the downlink and uplink respectively. OFDMA allows use of multiple known antenna techniques, such as, Multiple Input Multiple Output ("MIMO").

The air interface 122 uses various protocols, which include a radio resource control ("RRC") for signaling between the user equipment 104 and eNodeB 106 and non-access stratum ("NAS") for signaling between the user equipment 104 and MME (as shown in FIG. 1c). In addition to signaling, user traffic is transferred between the user equipment 104 and eNodeB 106. Both signaling and traffic in the system 100 are carried by physical layer ("PHY") channels.

Multiple eNodeBs 106 can be interconnected with one another using an X2 interface 130(a, b, c). As shown in FIG. 1a, X2 interface 130a provides interconnection between eNodeB 106a and eNodeB 106b; X2 interface 130b provides interconnection between eNodeB 106a and eNodeB 106c; and X2 interface 130c provides interconnection between eNodeB 106b and eNodeB 106c. The X2 interface can be established between two eNodeBs in order to provide an exchange of signals, which can include a load- or interference-related information as well as handover-related information. The eNodeBs 106 communicate with the evolved packet core 108 via an S1 interface 124(a, b, c). The S1 interface 124 can be split into two interfaces: one for the control plane (shown as control plane interface (S1-MME interface) 128 in FIG. 1c) and the other for the user plane (shown as user plane interface (S1-U interface) 125 in FIG. 1c).

The EPC 108 establishes and enforces Quality of Service ("QoS") for user services and allows user equipment 104 to maintain a consistent internet protocol ("IP") address while moving. It should be noted that each node in the network 100 has its own IP address. The EPC 108 is designed to interwork with legacy wireless networks. The EPC 108 is also designed to separate control plane (i.e., signaling) and user plane (i.e., traffic) in the core network architecture, which allows more flexibility in implementation, and independent scalability of the control and user data functions.

The EPC 108 architecture is dedicated to packet data and is shown in more detail in FIG. 1c. The EPC 108 includes a serving gateway (S-GW) 110, a PDN gateway (P-GW) 112, a mobility management entity ("MME") 114, a home subscriber server ("HSS") 116 (a subscriber database for the EPC 108), and a policy control and charging rules function ("PCRF") 118. Some of these (such as S-GW, P-GW, MME, and HSS) are often combined into nodes according to the manufacturer's implementation.

The S-GW 110 functions as an IP packet data router and is the user equipment's bearer path anchor in the EPC 108. Thus, as the user equipment moves from one eNodeB 106 to another during mobility operations, the S-GW 110 remains the same and the bearer path towards the EUTRAN 102 is switched to talk to the new eNodeB 106 serving the user equipment 104. If the user equipment 104 moves to the domain of another S-GW 110, the MME 114 will transfer all of the user equipment's bearer paths to the new S-GW. The S-GW 110 establishes bearer paths for the user equipment to one or more P-GWs 112. If downstream data are received for an idle user equipment, the S-GW 110 buffers the downstream packets and requests the MME 114 to locate and reestablish the bearer paths to and through the EUTRAN 102.

The P-GW 112 is the gateway between the EPC 108 (and the user equipment 104 and the EUTRAN 102) and PDN 101 (shown in FIG. 1a). The P-GW 112 functions as a router for user traffic as well as performs functions on behalf of the user equipment. These include IP address allocation for the user equipment, packet filtering of downstream user traffic to ensure it is placed on the appropriate bearer path, enforcement of downstream QoS, including data rate. Depending upon the services a subscriber is using, there may be multiple user data bearer paths between the user equipment 104 and P-GW 112. The subscriber can use services on PDNs served by different P-GWs, in which case the user equipment has at least one bearer path established to each P-GW 112. During handover of the user equipment from one eNodeB to another, if the S-GW 110 is also changing, the bearer path from the P-GW 112 is switched to the new S-GW.

The MME 114 manages user equipment 104 within the EPC 108, including managing subscriber authentication, maintaining a context for authenticated user equipment 104, establishing data bearer paths in the network for user traffic, and keeping track of the location of idle mobiles that have not detached from the network. For idle user equipment 104 that needs to be reconnected to the access network to receive downstream data, the MME 114 initiates paging to locate the user equipment and re-establishes the bearer paths to and through the EUTRAN 102. MME 114 for a particular user equipment 104 is selected by the eNodeB 106 from which the user equipment 104 initiates system access. The MME is typically part of a collection of MMEs in the EPC 108 for the purposes of load sharing and redundancy. In the establishment of the user's data bearer paths, the MME 114 is responsible for selecting the P-GW 112 and the S-GW 110, which will make up the ends of the data path through the EPC 108.

The PCRF 118 is responsible for policy control decision-making, as well as for controlling the flow-based charging functionalities in the policy control enforcement function ("PCEF"), which resides in the P-GW 110. The PCRF 118 provides the QoS authorization (QoS class identifier ("QCI") and bit rates) that decides how a certain data flow will be treated in the PCEF and ensures that this is in accordance with the user's subscription profile.

As stated above, the IP services 119 are provided by the PDN 101 (as shown in FIG. 1a).

Figure 1D:
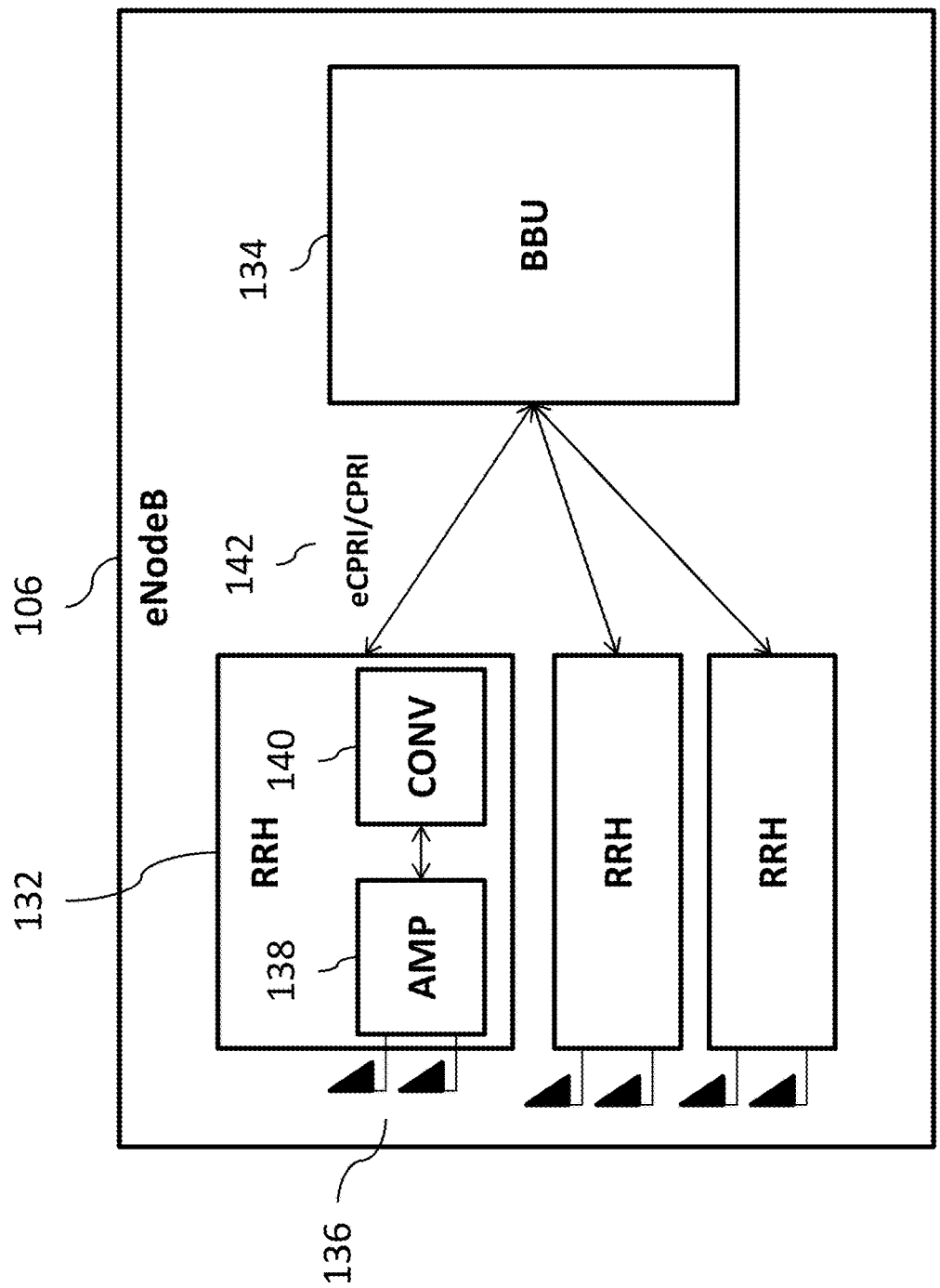

FIG. 1d illustrates an exemplary structure of eNodeB 106. The eNodeB 106 can include at least one remote radio head ("RRH") 132 (typically, there can be three RRH 132) and a baseband unit ("BBU") 134. The RRH 132 can be connected to antennas 136. The RRH 132 and the BBU 134 can be connected using an optical interface that is compliant with common public radio interface/enhanced CPRI ("CPRI/eCPRI") 142 standard specification. The BBU 134 can be responsible for digital baseband signal processing, termination of S1 line, termination of X2 line, call processing and monitoring control processing. IP packets that are received from the EPC 108 (not shown in FIG. 1*d*) can be modulated into digital baseband signals and transmitted to the RRH 132. Conversely, the digital baseband signals received from the RRH 132 can be demodulated into IP packets for transmission to EPC 108.

The RRH 132 can transmit and receive wireless signals using antennas 136. The RRH 132 can convert (using converter ("CONV") 140) digital baseband signals from the BBU 134 into radio frequency ("RF") signals and power amplify (using amplifier ("AMP") 138) them for transmission to user equipment 104 (not shown in FIG. 1*d*). Conversely, the RF signals that are received from user equipment 104 are amplified (using AMP 138) and converted (using CONV 140) to digital baseband signals for transmission to the BBU 134.

Figure 2:
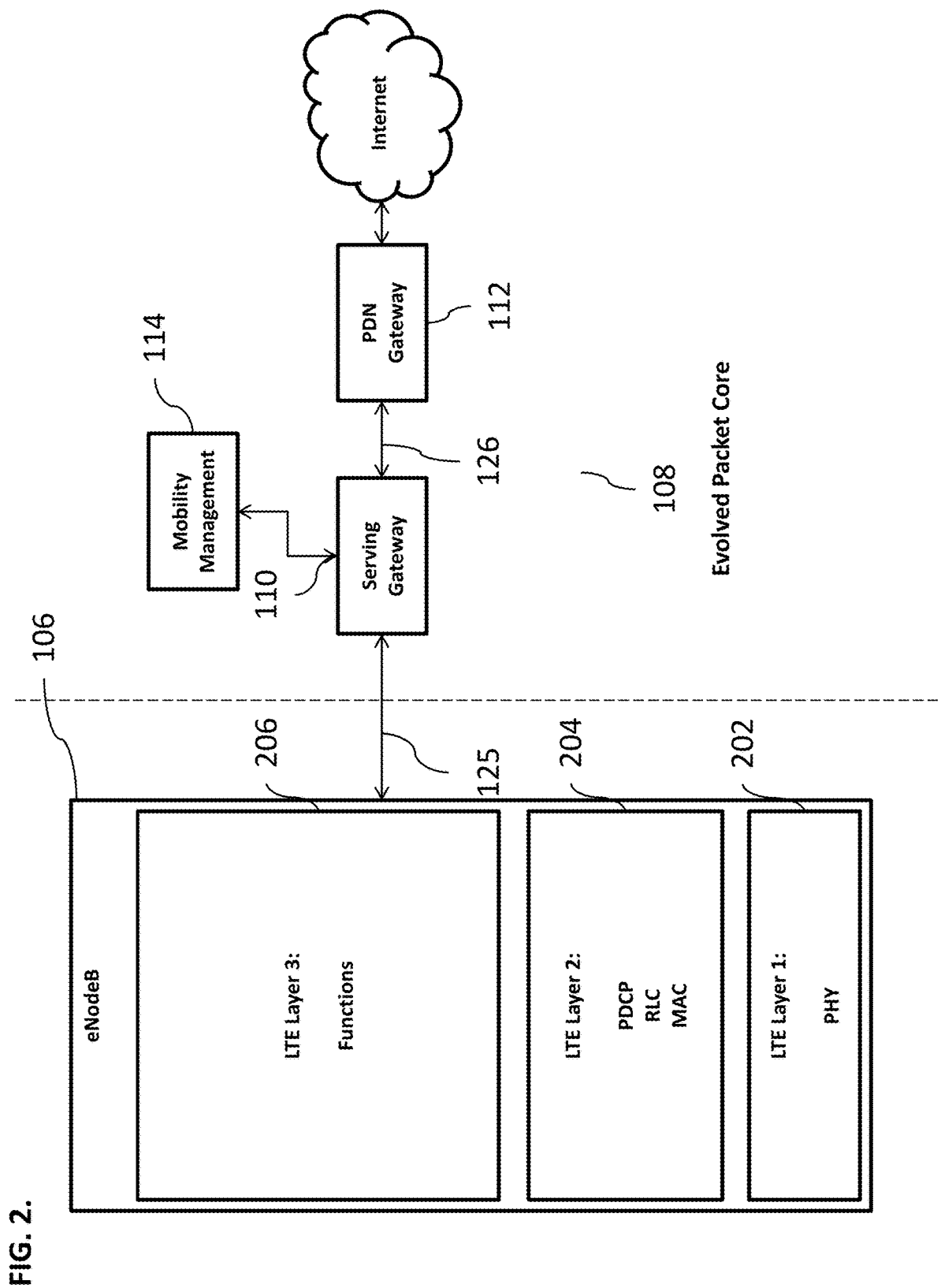
FIG. 2 illustrates further detail of an evolved Node B shown in FIGS. 1a-d.

FIG. 2 illustrates an additional detail of an exemplary eNodeB 106. The eNodeB 106 includes a plurality of layers: LTE layer 1 202, LTE layer 2 204, and LTE layer 3 206. The LTE layer 1 includes a physical layer ("PHY"). The LTE layer 2 includes a medium access control ("MAC"), a radio link control ("RLC"), a packet data convergence protocol ("PDCP"). The LTE layer 3 includes various functions and protocols, including a radio resource control ("RRC"), a dynamic resource allocation, eNodeB measurement configuration and provision, a radio admission control, a connection mobility control, and radio resource management ("RRM"). The RLC protocol is an automatic repeat request ("ARQ") fragmentation protocol used over a cellular air interface. The RRC protocol handles control plane signaling of LTE layer 3 between the user equipment and the EUTRAN. RRC includes functions for connection establishment and release, broadcast of system information, radio bearer establishment/reconfiguration and release, RRC connection mobility procedures, paging notification and release, and outer loop power control. The PDCP performs IP header compression and decompression, transfer of user data and maintenance of sequence numbers for Radio Bearers. The BBU 134, shown in FIG. 1*d*, can include LTE layers L1-L3.

One of the primary functions of the eNodeB 106 is radio resource management, which includes scheduling of both uplink and downlink air interface resources for user equipment 104, control of bearer resources, and admission control. The eNodeB 106, as an agent for the EPC 108, is responsible for the transfer of paging messages that are used to locate mobiles when they are idle. The eNodeB 106 also communicates common control channel information over the air, header compression, encryption and decryption of the user data sent over the air, and establishing handover reporting and triggering criteria. As stated above, the eNodeB 106 can collaborate with other eNodeB 106 over the X2 interface for the purposes of handover and interference management. The eNodeBs 106 communicate with the EPC's MME via the S1-MME interface and to the S-GW with the S1-U interface. Further, the eNodeB 106 exchanges user data with the S-GW over the S1-U interface. The eNodeB 106 and the EPC 108 have a many-to-many relationship to support load sharing and redundancy among MMES and S-GWs. The eNodeB 106 selects an MME from a group of MMES so the load can be shared by multiple MMES to avoid congestion.

II. 5G NR Wireless Communications Networks

In some implementations, the current subject matter relates to a 5G new radio ("NR") communications system. The 5G NR is a next telecommunications standard beyond the 4G/IMT-Advanced standards. 5G networks offer at higher capacity than current 4G, allow higher number of mobile broadband users per area unit, and allow consumption of higher and/or unlimited data quantities in gigabyte per month and user. This can allow users to stream high-definition media many hours per day using mobile devices, even when not Wi-Fi networks. 5G networks have an improved support of device-to-device communication, lower cost, lower latency than 4G equipment and lower battery consumption, etc. Such networks have data rates of tens of megabits per second for a large number of users, data rates of 100 Mb/s for metropolitan areas, 1 Gb/s simultaneously to users within a confined area (e.g., office floor), a large number of simultaneous connections for wireless sensor networks, an enhanced spectral efficiency, improved coverage, enhanced signaling efficiency, 1-10 ms latency, reduced latency compared to existing systems.

Figure 3:
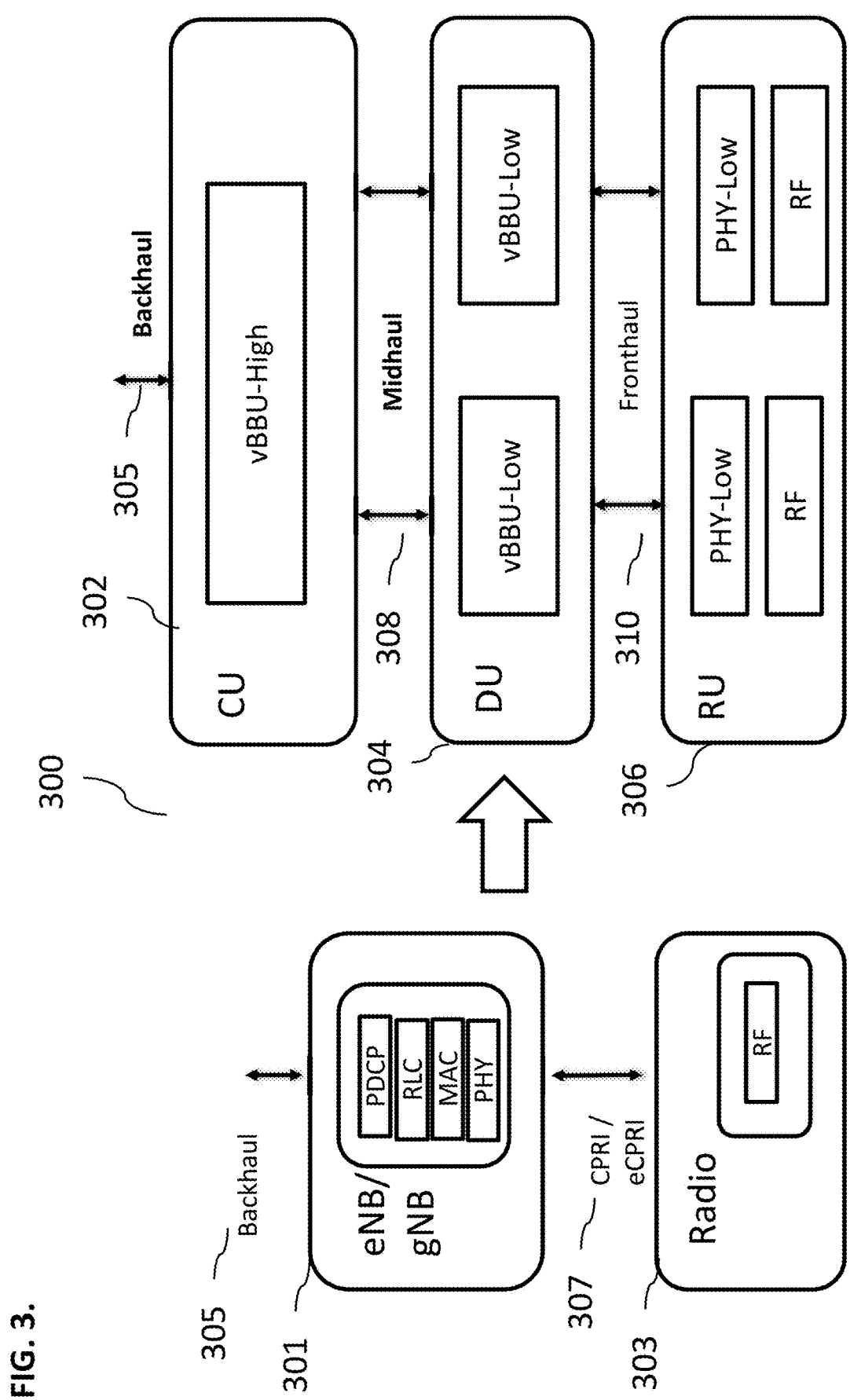
FIG. 3 illustrates an exemplary virtual radio access network, according to some implementations of the current subject matter.

FIG. 3 illustrates an exemplary virtual radio access network 300. The network 300 can provide communications between various components, including a base station (e.g., eNodeB, gNodeB) 301, a radio equipment 303, a centralized unit 302, a digital unit 304, and a radio device 306. The components in the system 300 can be communicatively coupled to a core using a backhaul link 305. A centralized unit ("CU") 302 can be communicatively coupled to a distributed unit ("DU") 304 using a midhaul connection 308. The radio frequency ("RU") components 306 can be communicatively coupled to the DU 304 using a fronthaul connection 310.

In some implementations, the CU 302 can provide intelligent communication capabilities to one or more DU units 308. The units 302, 304 can include one or more base stations, macro base stations, micro base stations, remote radio heads, etc. and/or any combination thereof.

In lower layer split architecture environment, a CPRI bandwidth requirement for NR can be 100s of Gb/s. CPRI compression can be implemented in the DU and RU (as shown in FIG. 3). In 5G communications systems, compressed CPRI over Ethernet frame is referred to as eCPRI and is the recommended fronthaul interface (e.g., interface 307). The architecture can allow for standardization of fronthaul/midhaul, which can include a higher layer split (e.g., Option 2 or Option 3-1 (Upper/Lower RLC split architecture)) and fronthaul with L1-split architecture (Option 7).

In some implementations, the lower layer-split architecture (e.g., Option 7) can include a receiver in the uplink, joint processing across multiple transmission points (TPs) for both DL/UL, and transport bandwidth and latency requirements for ease of deployment. Further, the current subject matter's lower layer-split architecture can include a split between cell-level and user-level processing, which can include cell-level processing in remote unit ("RU") and user-level processing in DU. Further, using the current subject matter's lower layer-split architecture, frequency-domain samples can be transported via Ethernet fronthaul, where the frequency-domain samples can be compressed for reduced fronthaul bandwidth.

Figure 4:
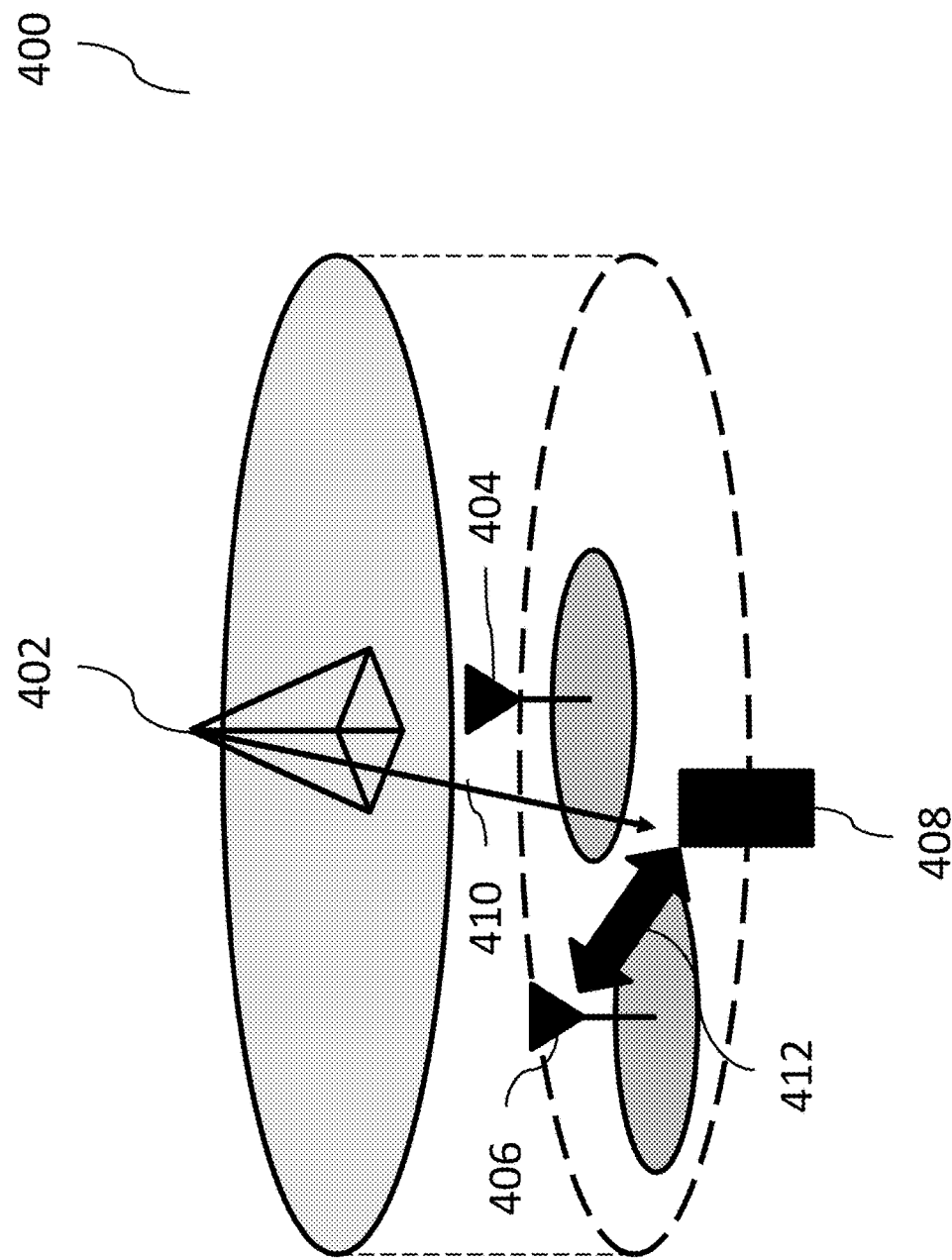
FIG. 4 illustrates an exemplary 3GPP split architecture to provide its users with use of higher frequency bands.

FIG. 4 illustrates an exemplary communications system 400 that can implement a 5G technology and can provide its users with use of higher frequency bands (e.g., greater than 10 GHz). The system 400 can include a macro cell 402 and small cells 404 and 406.

A mobile device 408 can be configured to communicate with one or more of the small cells 404, 406. The system 400 can allow splitting of control planes (C-plane) and user planes (U-plane) between the macro cell 402 and small cells 404, 406, where the C-plane and U-plane are utilizing different frequency bands. In particular, the small cells 402, 404 can be configured to utilize higher frequency bands when communicating with the mobile device 408. The macro cell 402 can utilize existing cellular bands for C-plane communications. The mobile device 408 can be communicatively coupled via U-plane 412, where the small cell (e.g., small cell 406) can provide higher data rate and more flexible/cost/energy efficient operations. The macro cell 402, via C-plane 410, can maintain good connectivity and mobility. Further, in some cases, LTE control channels (e.g. PUCCH/PDCCH) and NR control channels (e.g. PUCCH/PDCCH) can be transmitted on the same frequency.

III. Dynamic Spectrum Sharing

In some implementations, the current subject matter can be configured to perform dynamic spectrum sharing of in the communication network that can include LTE-based communications nodes (e.g., eNodeBs, and/or any other types of existing base stations) and 5G-based communications nodes (e.g., gNodeBs, etc.) for the purposes of allowing communications with different types of radio equipments. The dynamic spectrum sharing (DSS) can be accomplished through partitioning or splitting of radio resources into one or more LTE-based resource elements (LTE-RE) and one or more NR-based resource elements (NR-RE) as the LTE and NR follow similar waveforms and similar baseline frame structure (e.g., in LTE: 1 PRB can be 12 sub-carriers of 15 KHz subcarrier spacing (SCS); in NR: SCS can be 15 or 30 or 60 KHz in frequency range 1 (FR1), and 60 or 120 or 240 KHz in frequency range 2 (FR2)). As can be understood, radio resources can be split among any other types of systems (e.g., LTE, LTE-A, 5G, 6G, and/or any other systems). Such partitioning of radio resources can allow operators to gradually introduce 5G communications capabilities using existing LTE bands without impacting services of existing LTE (or other types of systems) customers.

In some implementations, to perform dynamic spectrum sharing, the current subject matter can be configured to allow simultaneous control of a single radio unit (RU) by a LTE distributed unit (DU) and an NR DU, whereby radio resources can be partitioned and coordinated between these DUs. The current subject matter, as discussed below, can be also configured to resolve an issue with LTE communications networks, whereby every physical resource block (PRB) has resource elements used to transmit cell specific reference signal (CRS) that occupies every PRB in LTE.

A. Resource Element-Based Split Toward LTE and NR DUs

Figure 5:
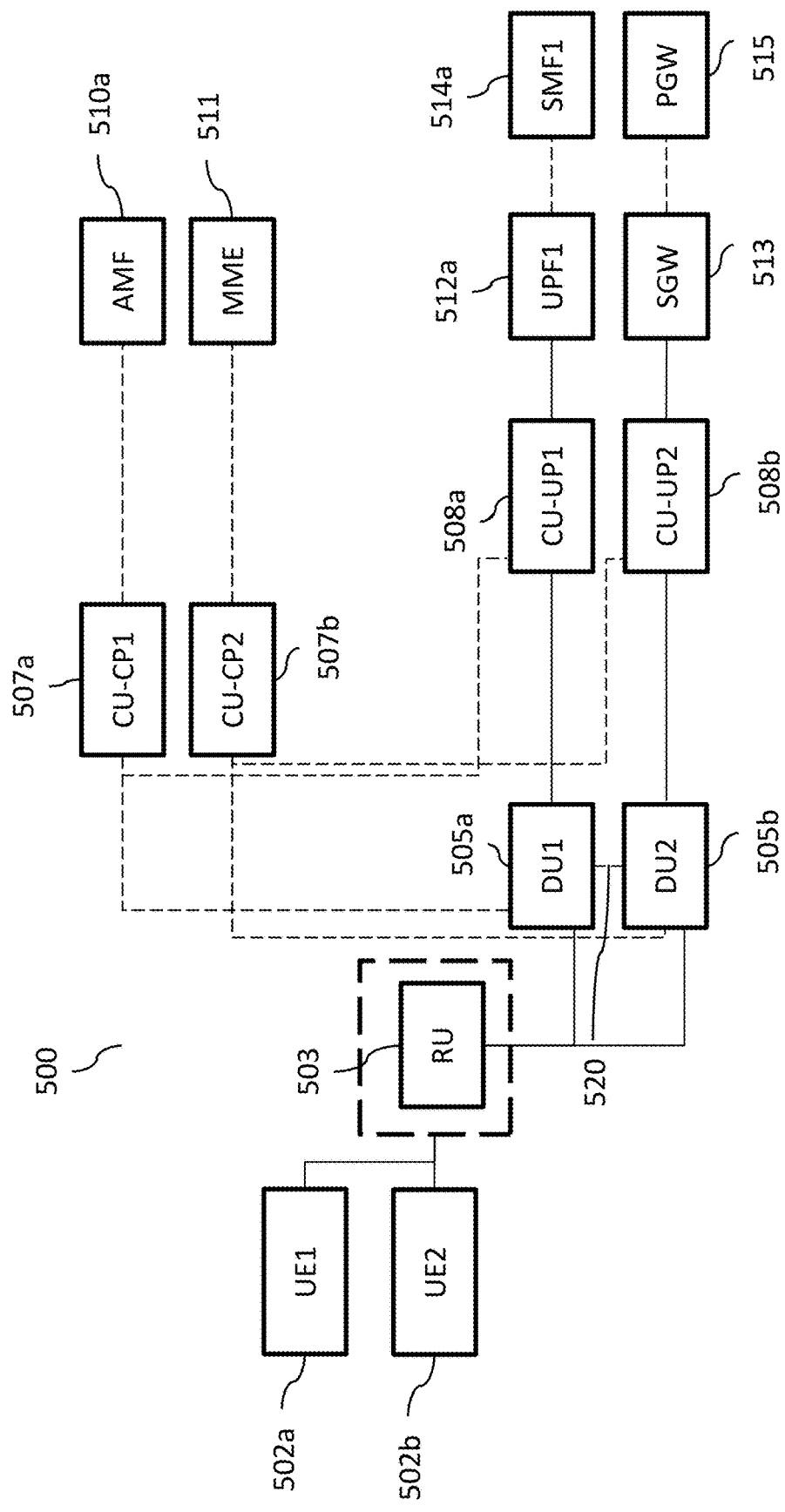
FIG. 5 illustrates an exemplary communication system for executing dynamic spectrum sharing process (e.g., controlling of a single RU unit using one more DUs, where DUs can communicate with components of different types of communications networks (e.g., LTE, NR)), according to some implementations of the current subject matter.

FIG. 5 illustrates an exemplary communication system 500 for executing dynamic spectrum sharing process (e.g., controlling of a single RU unit using one more DUs, where DUs can communicate with components of different types of communications networks (e.g., LTE, NR)), according to some implementations of the current subject matter.

The system 500 can include one or more user equipments 502 (a, b), where, by way of a non-limiting example, the user equipment 502a can be configured to be capable of operating in a first type of communications network (e.g., NR) and the user equipment 502b can be configured to be capable of operating in a second type of communications network (e.g., LTE). Components operating in the first type of communication network are designated using "a" in the reference numerals and components operating in the second type of communication network are designated using "b" in the reference numerals. As can be understood, the user equipments 502 can be configured to have various capabilities, whereby one user equipment can operate in both NR and LTE and the other in LTE only, one UE can operate in NR only and the other in LTE only, etc.

The system 500 can also include a common remote unit 503, one or more distributed units DU1-2 505 (a, b), and one or more corresponding control plane portions CU-CP1-2 507 (a, b) of the centralized unit. All user equipments 502 can access the same remote unit 503 before radio access technology (RAT) split occurs at the distributed units 505, where the DU units 505 can be configured to control the same RU 503. Moreover, the DUs 505 can be communicatively coupled via an interface 520 for the purposes of executing dynamic resource coordination process, as will be described below with respect to FIGS. 7-8.

Similar to the discussion above, RAT resource isolation can be provided from the DU 503 onwards. In particular, in addition to the separate DU1-2 505, control portions CU-CP1-2 507, separate CU-UP instances 508 (a, b) can be generated by the radio access network for each portion that may be configured to serve or allow access by the respective user equipments 502 (a, b).

Further, because of the different types of communications networks that are being used in the system 500, the CU-CP1 507a instance, that can be part of the first type (e.g., NR) communication network configured to service the UE 502a, can be communicatively coupled to an access and mobility function (AMF) 510a. However, the CU-CP2 instance, that can be part of the second type (e.g., LTE) communications network configured to service the UE 502b, can be communicatively coupled to mobility management entity (MME) 511. Moreover, the CU-UP1 508 instance can be communicatively coupled to a user plane function (UPF1) 512a and session management function (SMF1) 514a. The CU-UP2 508b instance can be communicatively coupled to a serving gateway (SGW) 513 and PDN gateway (PGW) 515.

Additionally, the DU1 505a can control the RU 503, including controlling radio bandwidth and assigning a specific resource elements (RE) within a carrier's bandwidth to the NR RAT. The DU2 505b can be configured to also control the RU 503. In particular, each DU 505 can be configured to control the RU 503 by indicating which I/Q samples are/have been/will be transmitted and/or received on which component carriers and/or which set of PRBs and/or which set of resource elements within the carrier bandwidth is to be handled by which DU 505. Each DU 505 can be identified by a specific DU port identifier so that data can be properly transmitted/received between RU 503 and particular DUs 505. Further, messages exchanged between the DUs 505 and RU 503 can include section type control messages, which can include an eCPRI transport header, a DU port identifier, a carrier component identifier (to differentiate between carrier components that may be supported by the RU 503) and a RU port ID (identifying a particular RU).

Using the control plane of the system 500, the RU 503 can be instructed (via fronthaul C-plane) to process downlink and uplink user plane traffic (e.g., I/Q samples) for specific resource elements from/to DU2 505b (e.g., LTE) and specific resource elements from/to DU1 505a (e.g., NR). In particular, each DU 505 can configure/control a different resource element in the RU 503. A resource element mask (e.g., "reMask") that can be included in a control plane message can be used to control how resource elements are used for transmission/receiving of fronthaul user plane traffic to/from a particular DU 505. FIG. 6 illustrates an exemplary control plane message 600 that includes a resource element mask field 602. Each bit setting in the resource element mask can indicate if a section control is applicable to the resource element sent in a user plane message (e.g., 0—not applicable; 1—applicable). A most significant bit (MSB) can indicate a value for the resource element having the lowest frequency in a PRB, where different resource elements can be indicated using different resource element masks. In some implementations, based on a CRS rate matching pattern that can be configured in the DU 505, the DU 505 can mask out the resource elements, where LTE-based components can be configured to send the CRS (e.g., any bits corresponding to the LTE-based CRS resource elements can be set to 0 in the resource element mask). Further, for any uplink data and depending on which resource element an I/Q sample is received, the RU 503 can be configured to transmit the sample to the correct DU 505.

Figure 7:
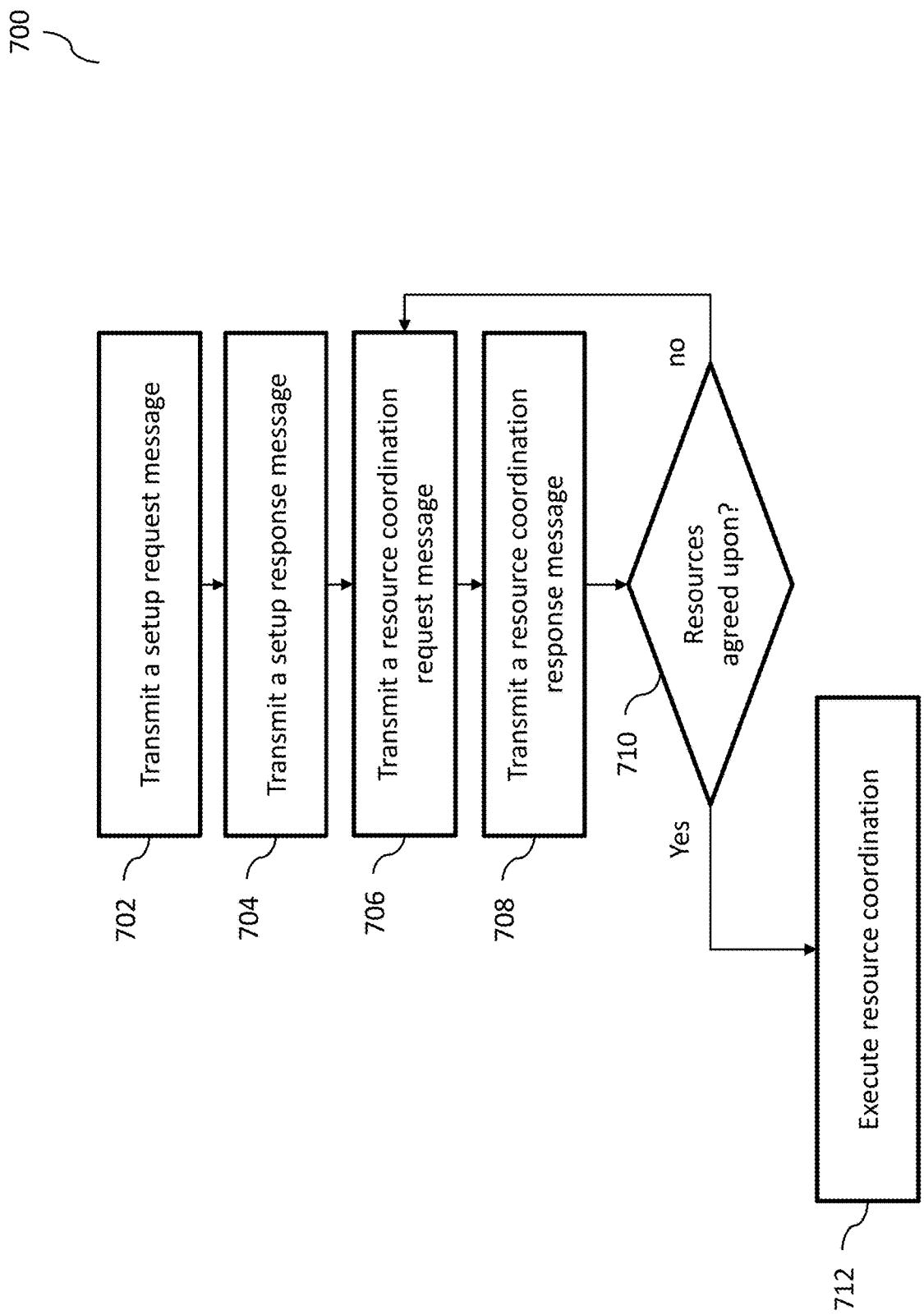
FIG. 7 illustrates an exemplary process for executing dynamic resource coordination between DUs (e.g., LTE DU and NR DU, as shown in FIG. 5), according to some implementations of the current subject matter.
Figure 8:
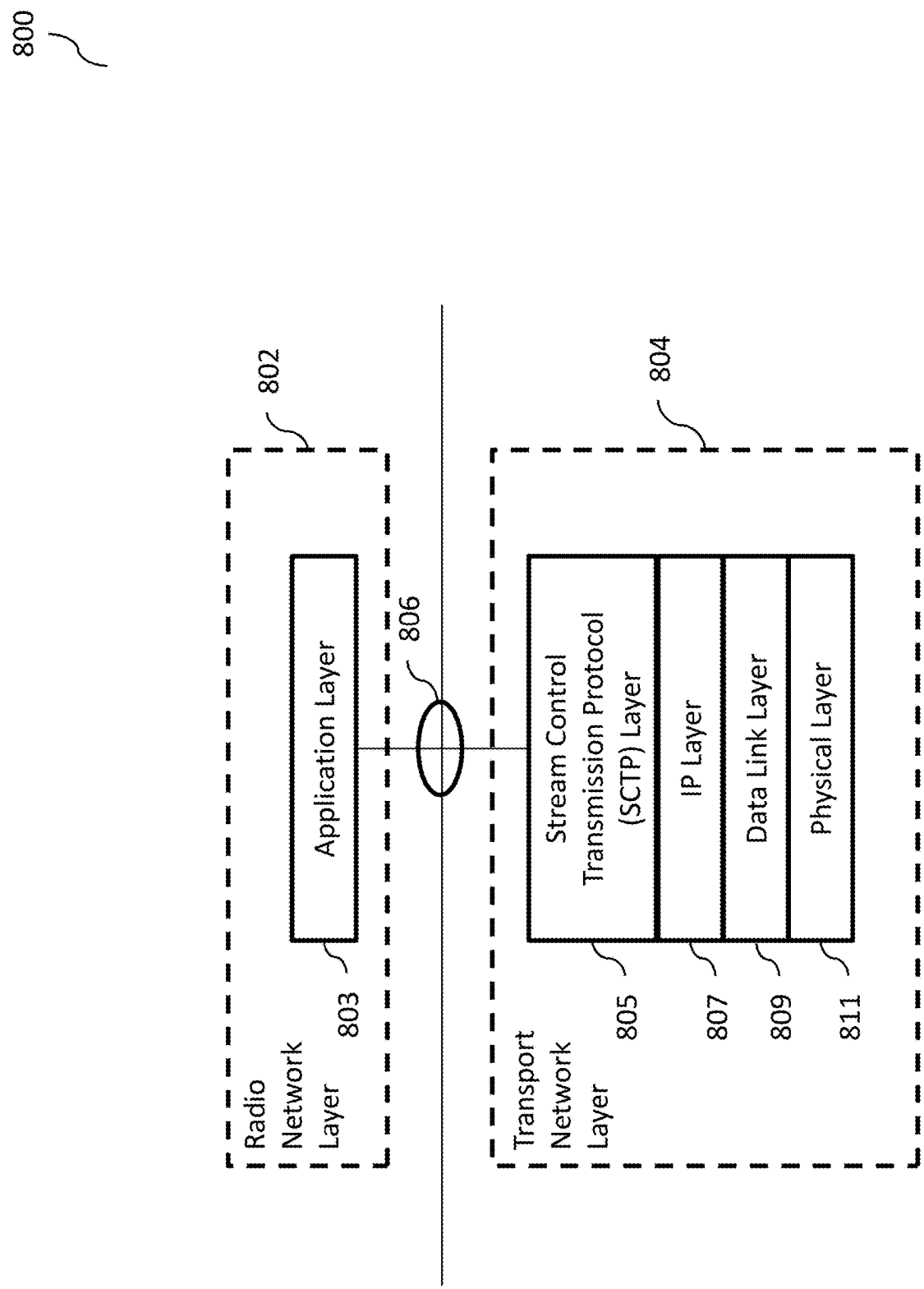
FIG. 8 illustrates an exemplary interface system for executing the process shown in FIG. 7, according to some implementations of the current subject matter.

FIG. 7 illustrates an exemplary process 700 for executing dynamic resource coordination between DUs 505 (e.g., LTE DU 505*b* and NR DU 505*a*, as shown in FIG. 5), according to some implementations of the current subject matter. It should be noted that any resource elements, where CRS has to be transmitted by LTE components, can only be used by DU 505*b* (i.e., LTE DU) and hence, the process 700 may be applicable for executing dynamic coordination with respect to the remaining resource elements that bear no such requirements. The process 700 can be executed via an interface system 800, as shown in FIG. 8, by the respective scheduler components of the DU 505*a* and DU 505*b*. In particular, as shown in FIG. 8, messages transmitted as part of process 700 (as discussed below) can be transmitted between a radio network layer 802 and transport network layer 804 via an interface 806 (e.g., communicatively coupling the radio network layer 802 and transport network layer 804). The radio network layer 802 can include, among other layers, an application layer 803 (e.g., an application layer can refer to a DU-DU resource coordination protocol application layer). The transport network layer 804 can include, among other layers, a stream control transmission protocol (SCTP) layer (as standardized by IETF in RFC 4960) 805, an IP layer 807, a data link layer 809, and a physical layer 811. In some implementations, the SCTP layer can be configured to initiate transmission of messages (e.g., part of the process 700) between DUs. In some implementations, the DU-DU interface may be referred to as Xn' and application protocol may be referred to as Xn'-AP.

Referring back to FIG. 7, at 702, a setup request message may be transmitted from one DU to another DU (e.g., DU 505*a* to DU 505*b*). As can be understood, any DU can initiate the process 700. At 704, responsive message is received from the second DU (e.g., DU 505*b* to DU 505*a*). These messages can be configured to exchange various system level details, including at least one of the following: served cells, cell IDs, overall system bandwidth, absolute radio-frequency channel number (ARFCN) of each carrier in the served cells, the REs scheduled by a DU for a particular RAT, and any other information.

At 706, a resource coordination request message may be transmitted from one DU to another DU (e.g., DU 505*a* to DU 505*b*). At 708, a responsive message can be received. These messages can be configured to exchange dynamic resource allocation status between the DUs 505. Similar to the message in 702-704, either DU 505 can be configured to initiate the request at 706. The responding DU can be configured to provide an indication of a resource allocation that it can agree upon (e.g., resource allocations that can be available for coordination, resource allocation available, etc.). In some implementations, the request message (at 706) can be configured to include an indication of a suggested resource allocation for the initiating DU. For example, if DU 505*a* (e.g., NR DU) initiate the request (at 706), it can be configured to transmit to DU 505*b* the resource allocation it needs leaving the rest of resources for DU 505*b* (e.g., LTE DU). In some implementations, the responsive message (at 708) can be configured to include agreed upon resource allocation by the responding party (e.g., LTE DU 505*b*). For example, agreed upon resource allocations can be transmitted as a list of PRB IDs, where for each PRB in the list, a bitmap of resource elements allocated for initiating entity's use can be included. Alternatively, or in addition to, the agreed upon resource allocations can include resource elements in a PRB can be numbered from 0 to 83. For LTE, there are a total of 84 resource elements in a PRB, i.e., 12 sub-carriers times 7 symbols. For NR, a PRB can include 14 symbols.

If the resources are agreed upon, coordination of resource elements using information that has been exchanged by DUs 505 can be executed, at 710-712. This can involve the DUs instructing the RU which REs can be controlled by which DU. In some implementations, fronthaul control plane (C-plane) messages can be used for these purposes and the REs that are scheduled to a DU can be indicated using reMask (as discussed above). Alternatively, the process 706 can be executed again.

Figure 9:
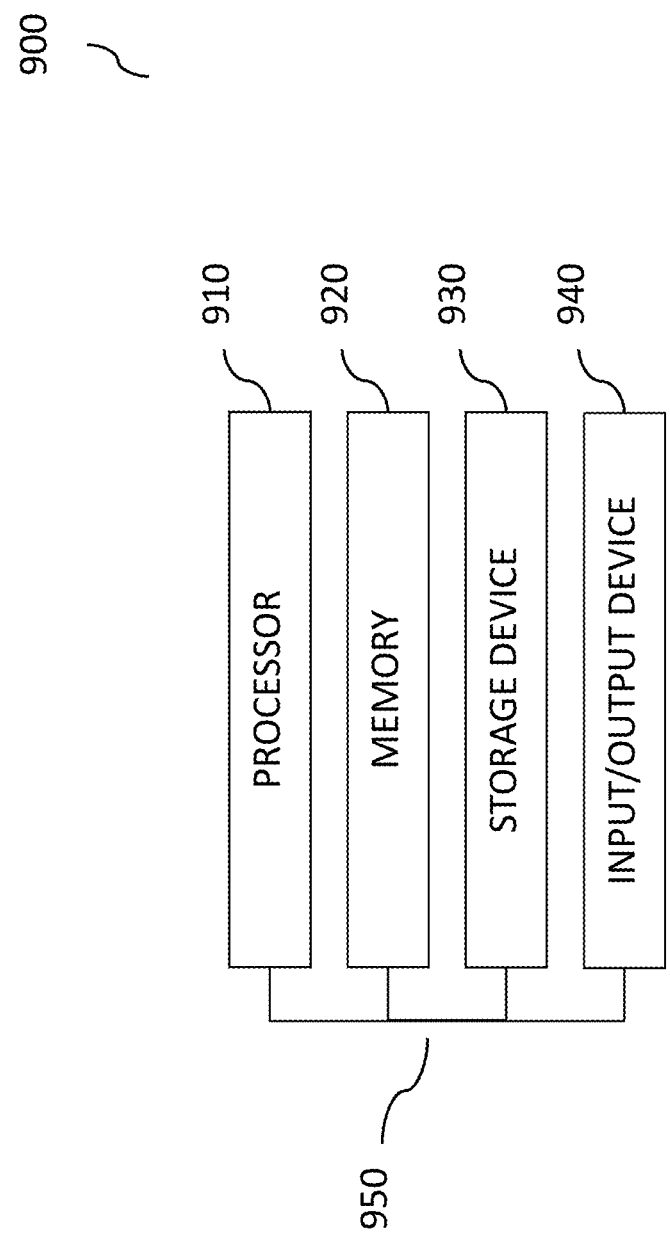
FIG. 9 illustrates an exemplary system, according to some implementations of the current subject matter.

In some implementations, the current subject matter can be configured to be implemented in a system 900, as shown in FIG. 9. The system 900 can include one or more of a processor 910, a memory 920, a storage device 930, and an input/output device 940. Each of the components 910, 920, 930 and 940 can be interconnected using a system bus 950. The processor 910 can be configured to process instructions for execution within the system 600. In some implementations, the processor 910 can be a single-threaded processor. In alternate implementations, the processor 910 can be a multi-threaded processor. The processor 910 can be further configured to process instructions stored in the memory 920 or on the storage device 930, including receiving or sending information through the input/output device 940. The memory 920 can store information within the system 900. In some implementations, the memory 920 can be a computer-readable medium. In alternate implementations, the memory 920 can be a volatile memory unit. In yet some implementations, the memory 920 can be a non-volatile memory unit. The storage device 930 can be capable of providing mass storage for the system 900. In some implementations, the storage device 930 can be a computer-readable medium. In alternate implementations, the storage device 930 can be a floppy disk device, a hard disk device, an optical disk device, a tape device, non-volatile solid state memory, or any other type of storage device. The input/output device 940 can be configured to provide input/output operations for the system 900. In some implementations, the input/output device 940 can include a keyboard and/or pointing device. In alternate implementations, the input/output device 940 can include a display unit for displaying graphical user interfaces.

Figure 10:
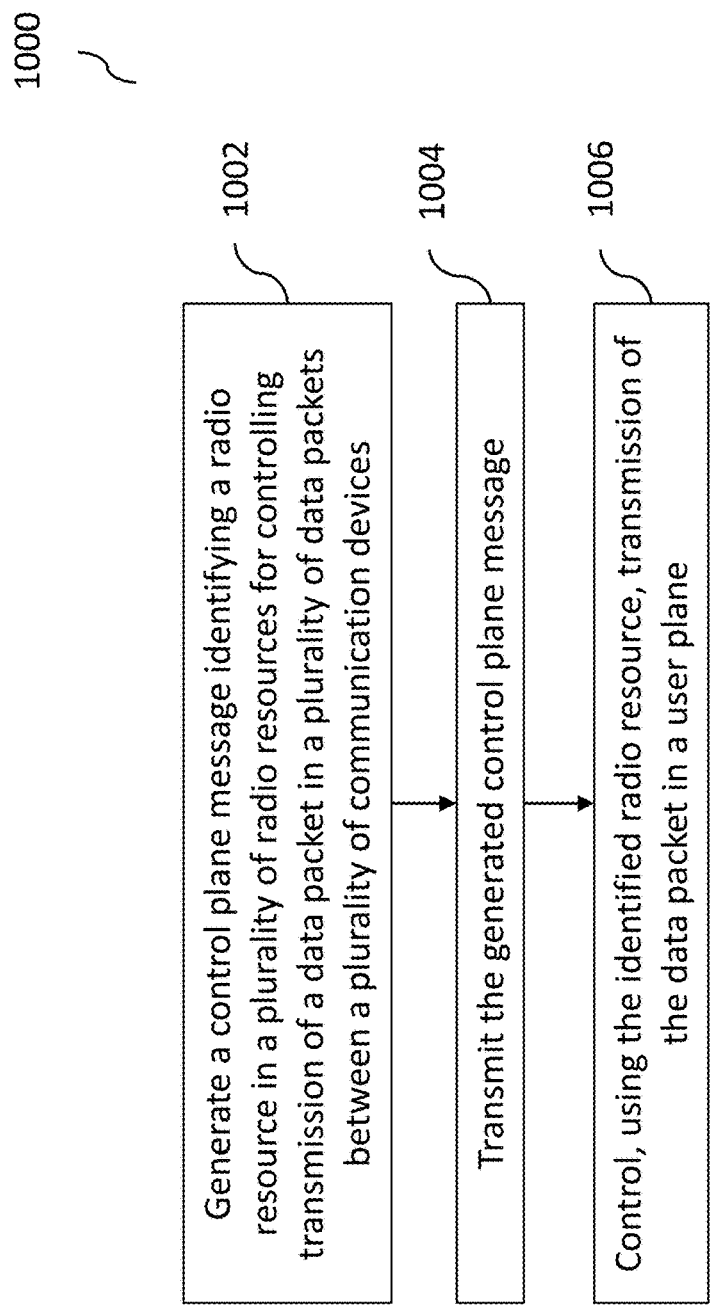
FIG. 10 illustrates an exemplary method, according to some implementations of the current subject matter.

FIG. 10 illustrates an exemplary method 1000, according to some implementations of the current subject matter. At 1002, a control plane message identifying a radio resource in a plurality of radio resources for controlling transmission of a data packet in a plurality of data packets between a plurality of communication devices can be generated. At 1004, the generated control plane message may be transmitted (e.g., from DU 505 to RU 503, as shown in FIG. 5). At 1006, using the identified radio resource, a transmission of the data packet can be controlled in a user plane.

In some implementations, the current subject matter can include one or more of the following optional features. The transmission of the generated control plane message can include transmitting the generated control plane message from a first communication device to a second communication device in a plurality of communication devices. Further, at least one of the generating, the transmitting and the controlling can be performed by a base station. The base station can include at least one of the following communication components: one or more remote radio units, and one or more distributed units.

In some implementations, the identified radio resource can include at least one of the following: one or more physical resource blocks, one or more resource elements, one or more carrier components, and any combination thereof. Further, the identified radio resource can be configured to be identified using a resource element mask. In some implementations, the generated control plane message can be transmitted from one or more distributed units of one or more base stations to one or more remote units of the base stations. The distributed units can include at least one of the following: distributed units operating in a first type of communication network and distributed units operating in a second type of communication network. The remote units associated with one or more base stations and having the identified radio resource can be configured to be controlled by one or more distributed units operating in the first and second types of communication networks. By way of an example, the first type of communication network can include a new radio communication network and the second type of communication network can include a long term evolution communication network.

In some implementations, the distributed units operating in the first type of communication network can be configured to be communicatively coupled, via an interface, to the distributed units operating in the second type of communication network for coordinating sharing of the plurality of radio resources to control operation of the remote units. Further, the distributed units operating in the first type of communication network and the distributed units operating in the second type of communication network can be configured to determine an allocation of radio resources in the plurality of radio resources for controlling operation of the one or more remote units. The allocation can be determined using a bitmap of radio resources allocated by at least one of: the distributed units operating in the first type of communication network, the distributed units operating in the second type of communication network, and any combination thereof.

The systems and methods disclosed herein can be embodied in various forms including, for example, a data processor, such as a computer that also includes a database, digital electronic circuitry, firmware, software, or in combinations of them. Moreover, the above-noted features and other aspects and principles of the present disclosed implementations can be implemented in various environments. Such environments and related applications can be specially constructed for performing the various processes and operations according to the disclosed implementations or they can include a general-purpose computer or computing platform selectively activated or reconfigured by code to provide the necessary functionality. The processes disclosed herein are not inherently related to any particular computer, network, architecture, environment, or other apparatus, and can be implemented by a suitable combination of hardware, software, and/or firmware. For example, various general-purpose machines can be used with programs written in accordance with teachings of the disclosed implementations, or it can be more convenient to construct a specialized apparatus or system to perform the required methods and techniques.

The systems and methods disclosed herein can be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

As used herein, the term "user" can refer to any entity including a person or a computer.

Although ordinal numbers such as first, second, and the like can, in some situations, relate to an order; as used in this document ordinal numbers do not necessarily imply an order. For example, ordinal numbers can be merely used to distinguish one item from another. For example, to distinguish a first event from a second event, but need not imply any chronological ordering or a fixed reference system (such that a first event in one paragraph of the description can be different from a first event in another paragraph of the description).

The foregoing description is intended to illustrate but not to limit the scope of the invention, which is defined by the scope of the appended claims. Other implementations are within the scope of the following claims.

These computer programs, which can also be referred to programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user can provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including, but not limited to, acoustic, speech, or tactile input.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. The components of the system can be interconnected by any form or medium of digital data communication, such as for example a communication network. Examples of communication networks include, but are not limited to, a local area network ("LAN"), a wide area network ("WAN"), and the Internet.

The computing system can include clients and servers. A client and server are generally, but not exclusively, remote from each other and typically interact through a communication network. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations can be within the scope of the following claims.

What is claimed:

1. A computer-implemented method, comprising:
   generating a control plane message identifying a radio resource in a plurality of radio resources for controlling transmission of a data packet in a plurality of data packets between a plurality of communication devices;
   transmitting the generated control plane message; and
   controlling, using the identified radio resource, transmission of the data packet in a user plane;
   wherein
   the identified radio resource includes at least one of the following: one or more physical resource blocks, one or more resource elements, one or more carrier components, and any combination thereof;
   the identified radio resource is configured to be identified using a resource element mask.

2. The method according to claim 1, wherein the transmitting the generated control plane message further comprises transmitting the generated control plane message from a first communication device to a second communication device in a plurality of communication devices.

3. The method according to claim 2, wherein at least one of the generating, the transmitting and the controlling is performed by a base station.

4. The method according to claim 3, wherein the base station includes at least one of the following communication components: one or more remote radio units, and one or more distributed units.

5. The method according to claim 1, wherein the generated control plane message is transmitted from one or more distributed units of one or more base stations to one or more remote units of the one or more base stations.

6. The method according to claim 5, wherein the one or more distributed units includes at least one of the following: one or more distributed units operating in a first type of communication network and one or more distributed units operating in a second type of communication network;
   wherein one or more remote units associated with one or more base stations and having the identified radio resource is configured to be controlled by one or more distributed units operating in the first and second types of communication networks.

7. The method according to claim 6, wherein the first type of communication network includes a new radio communication network and the second type of communication network includes a long term evolution communication network.

8. The method according to claim 6, wherein the one or more distributed units operating in the first type of communication network are configured to be communicatively coupled, via an interface, to the one or more distributed units operating in the second type of communication network for coordinating sharing the plurality of radio resources to control operation of the one or more remote units.

9. The method according to claim 8, wherein the one or more distributed units operating in the first type of communication network and the one or more distributed units operating in the second type of communication network are configured to determine an allocation of radio resources in the plurality of radio resources for controlling operation of the one or more remote units.

10. The method according to claim 9, wherein the allocation is determined using a bitmap of radio resources allocated by at least one of: the one or more distributed units operating in the first type of communication network, the one or more distributed units operating in the second type of communication network, and any combination thereof.

11. An apparatus comprising:
    at least one programmable processor; and
    a non-transitory machine-readable medium storing instructions that, when executed by the at least one programmable processor, cause the at least one programmable processor to perform operations comprising:
    generating a control plane message identifying a radio resource in a plurality of radio resources for controlling transmission of a data packet in a plurality of data packets between a plurality of communication devices;
    transmitting the generated control plane message; and
    controlling, using the identified radio resource, transmission of the data packet in a user plane;
    wherein
    the identified radio resource includes at least one of the following: one or more physical resource blocks, one or more resource elements, one or more carrier components, and any combination thereof;
    the identified radio resource is configured to be identified using a resource element mask.

12. The system according to claim 11, wherein the transmitting the generated control plane message further comprises transmitting the generated control plane message from a first communication device to a second communication device in a plurality of communication devices.

13. The system according to claim 12, wherein at least one of the generating, the transmitting and the controlling is performed by a base station.

14. The system according to claim 13, wherein the base station includes at least one of the following communication components: one or more remote radio units, and one or more distributed units.

15. The system according to claim 11, wherein the generated control plane message is transmitted from one or more distributed units of one or more base stations to one or more remote units of the one or more base stations.

16. The system according to claim 15, wherein the one or more distributed units includes at least one of the following: one or more distributed units operating in a first type of communication network and one or more distributed units operating in a second type of communication network;
wherein one or more remote units associated with one or more base stations and having the identified radio resource is configured to be controlled by one or more distributed units operating in the first and second types of communication networks.

17. The system according to claim 16, wherein the first type of communication network includes a new radio communication network and the second type of communication network includes a long term evolution communication network.

18. The system according to claim 16, wherein the one or more distributed units operating in the first type of communication network are configured to be communicatively coupled, via an interface, to the one or more distributed units operating in the second type of communication network for coordinating sharing the plurality of radio resources to control operation of the one or more remote units.

19. The system according to claim 18, wherein the one or more distributed units operating in the first type of communication network and the one or more distributed units operating in the second type of communication network are configured to determine an allocation of radio resources in the plurality of radio resources for controlling operation of the one or more remote units.

20. The system according to claim 19, wherein the allocation is determined using a bitmap of radio resources allocated by at least one of: the one or more distributed units operating in the first type of communication network, the one or more distributed units operating in the second type of communication network, and any combination thereof.

21. A computer program product comprising a non-transitory machine-readable medium storing instructions that, when executed by at least one programmable processor, cause the at least one programmable processor to perform operations comprising:
generating a control plane message identifying a radio resource in a plurality of radio resources for controlling transmission of a data packet in a plurality of data packets between a plurality of communication devices;
transmitting the generated control plane message; and
controlling, using the identified radio resource, transmission of the data packet in a user plane;
wherein
the identified radio resource includes at least one of the following: one or more physical resource blocks, one or more resource elements, one or more carrier components, and any combination thereof;
the identified radio resource is configured to be identified using a resource element mask.

22. The computer program product according to claim 21, wherein the transmitting the generated control plane message further comprises transmitting the generated control plane message from a first communication device to a second communication device in a plurality of communication devices.

23. The computer program product according to claim 22, wherein at least one of the generating, the transmitting and the controlling is performed by a base station.

24. The computer program product according to claim 23, wherein the base station includes at least one of the following communication components: one or more remote radio units, and one or more distributed units.

25. The computer program product according to claim 21, wherein the generated control plane message is transmitted from one or more distributed units of one or more base stations to one or more remote units of the one or more base stations.

26. The computer program product according to claim 25, wherein the one or more distributed units includes at least one of the following: one or more distributed units operating in a first type of communication network and one or more distributed units operating in a second type of communication network;
wherein one or more remote units associated with one or more base stations and having the identified radio resource is configured to be controlled by one or more distributed units operating in the first and second types of communication networks.

27. The computer program product according to claim 26, wherein the first type of communication network includes a new radio communication network and the second type of communication network includes a long term evolution communication network.

28. The computer program product according to claim 26, wherein the one or more distributed units operating in the first type of communication network are configured to be communicatively coupled, via an interface, to the one or more distributed units operating in the second type of communication network for coordinating sharing the plurality of radio resources to control operation of the one or more remote units.

29. The computer program product according to claim 28, wherein the one or more distributed units operating in the first type of communication network and the one or more distributed units operating in the second type of communication network are configured to determine an allocation of radio resources in the plurality of radio resources for controlling operation of the one or more remote units.

30. The computer program product according to claim 29, wherein the allocation is determined using a bitmap of radio resources allocated by at least one of: the one or more distributed units operating in the first type of communication network, the one or more distributed units operating in the second type of communication network, and any combination thereof.

* * * * *